Oct. 11, 1966  W. E. SCOTT  3,277,939
APPARATUS AND METHOD FOR THE FABRICATION OF
STRUCTURAL COMPONENTS
Filed Nov. 9, 1964  3 Sheets-Sheet 1

INVENTOR
William E. Scott

BY Donald W. Denton
ATTORNEY

Oct. 11, 1966    W. E. SCOTT    3,277,939
APPARATUS AND METHOD FOR THE FABRICATION OF
STRUCTURAL COMPONENTS
Filed Nov. 9, 1964    3 Sheets-Sheet 2

INVENTOR
WILLIAM E. SCOTT

BY Donald D Denton
ATTORNEY

Oct. 11, 1966 W. E. SCOTT 3,277,939
APPARATUS AND METHOD FOR THE FABRICATION OF
STRUCTURAL COMPONENTS
Filed Nov. 9, 1964 3 Sheets-Sheet 3
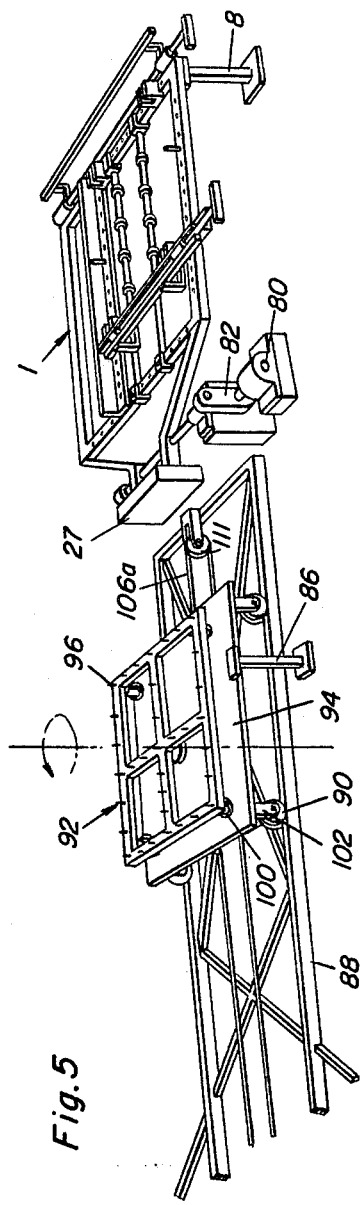
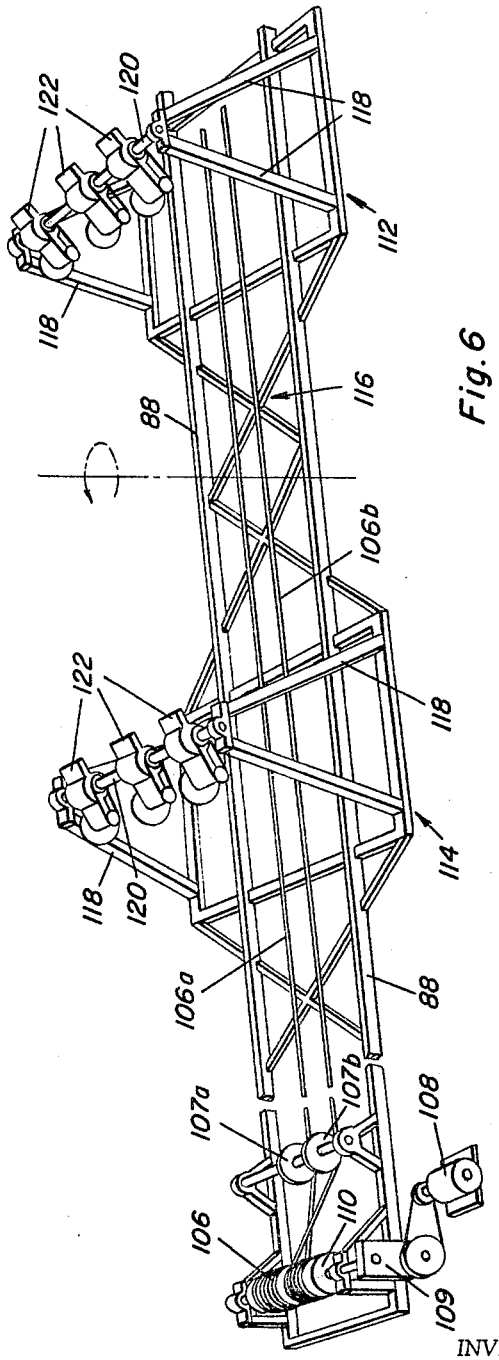
INVENTOR
William E. Scott
BY Donald D. Denton
ATTORNEY United States Patent Office 3,277,939
Patented Oct. 11, 1966

3,277,939
APPARATUS AND METHOD FOR THE FABRICATION OF STRUCTURAL COMPONENTS
William E. Scott, 4011 Angeles, Tampa, Fla.
Filed Nov. 9, 1964, Ser. No. 409,923
12 Claims. (Cl. 144—316)

This invention relates to a novel method and an apparatus for the fabrication of structural components. More particularly this invention relates to a method and an apparatus for rapid and accurate positioning, holding and transferring of structural elements to facilitate assembly of the elements into a multi-element structure, and thereafter cutting the structure to produce one or more structural units of the desired size and shape. This application is a continuation-in-part of my application Serial No. 379,907, filed on July 2, 1964 for Apparatus and Method for the Fabrication of Structural Components.

Heretofore, in the construction of building sections, i.e., panels, pallets, skids and other similar constructions, it has been necessary to employ considerable amounts of manual labor in the assembling, nailing, cutting and other operations required to construct such sections. Moreover, many of these operations are repeated over and over again and as a result, even the most skillful workman tends to become careless so that the sections are not always accurately constructed. Inasmuch as these building sections find many worthwhile applications, the production of large numbers of accurately constructed sections poses a problem to the art.

The present invention, however, is found to be particularly suitable in the fabrication of building sections or similar constructions from stringers, blocks, boards, metal sheets, irons, or other members wherein the operations of cutting, sawing, welding, nailing or otherwise securing the structural elements are performed with a degree of accuracy and certainty which cannot be obtained by conventional methods of manual construction. Thus, wallboard, flooring, siding, or other covering material may be applied to the framework first-produced so as to provide, advantageously, a building section ready for use directly in the erection of a building. Moreover, each of the operations is coordinated and carried out by a novel apparatus which serves to enable building sections uniformly alike to be produced, rapidly and semi-automatically, and with a minimum of labor.

The present invention is also eminently suited for the production of pallets which are used widely in industry for various purposes, particularly to facilitate the handling of material by lift trucks, whereby the forks of the lift trucks may readily be disposed beneath the pallet to raise and move said pallet and any objects or material carried thereon. For many years, however, as in the production of the building sections referred to above, the manufacture of pallets has been accomplished by the expenditure of considerable amount of manpower and thus the cost of such production has progressively been higher in recent years. Efforts to decrease the cost of manufacturing such pallets have been made by manufacturers utilizing fixed jigs of a single size or a limited number of sizes in order that the various components of the pallets to be manufactured might be assembled with a minimum requirement of time. If a manufacturer is utilizing a number of pallets of the same size or of only a limited number of different sizes, the use of fixed jigs may then be deemed feasible. However, wherever a manufacturer requires relatively wide range of different sizes of pallets, then the maintaining of an inventory of jigs of suitable sizes becomes quite expensive and also introduces a storage problem. Furthermore, jigs of this type frequently are quite large and heavy, whereby the moving of the same to and from storage during use presents added difficulties.

Typically, panels, pallets and the like are of multilayer construction, that is, they are structures formed of sheets, boards, or the like material fastened to one or more beam-like members or elements to form two, three, or more layers or decks. For example, a prefabricated structural panel for a building construction wall may have one or more flat sheets reinforced with spaced studs or stringers which are narrow elongated beams attached in parallel or crosswise to one side of the sheets or a double wall panel may be made of two layers of the sheet material separated by spaced parallel stringers. Likewise, pallets also may have one or more solid decks or decks made of several parallel boards with open gaps or spaces between the boards.

Thus, the present invention contemplates a novel apparatus which incorporates therein adjustable jig means for making building sections, such as pallets of a wider variety of sizes including the length and width of the deck or decks of the pallet but also in the amount of overhang of the deck or decks relative to the outer side surfaces of the stringers of said pallet.

Furthermore, this invention contemplates an apparatus for fabricating pallets, panels, skids and the like multi-element structures which includes adjustable jig means for facilitating manual assembly of multi-element structures of various sizes, conveyor means for receiving and transferring the assembled structures (i.e. workpieces) from the jig means, and cutting means arranged along the path of the conveyor means to trim and, when necessary, to cut the structures into two or more similarly constructed units.

In particular, this invention is directed to a power operated apparatus for producing a plurality of similar pallets or the like in a continuous manner which includes a pivotally mounted jig assembly for positioning and holding several structural members to facilitate nailing, stapling and other assembling operations, a movable trolley for receiving and transferring the assembled structure from the jig assembly, and a cutter or cutters at one or more cutting stations to trim the edges of the assembled structure and/or to cut it into a plurality of pallets; the movable trolley being positioned on a track so that the assembled structure is transferred from the jig assembly to the cutting stations.

In addition, this invention contemplates a method for fabricating structures having at least one deck member secured to a plurality of support members in stacked relation which comprises supporting, holding and uniting said deck and support members to form an assembled structure, transferring the assembled structure from the point of assembly and thereafter cutting the structure, to trim and/or to divide the structure into two or more similar structural units of the desired size and shape.

More particularly, one espect of this invention is directed to a method for fabrication of pallets or the like structures which includes the steps of (1) placing a first layer or deck of boards in parallel relationship in a pivotally mounted jig assembly, (2) supporting stringers or other beam-like members crosswise to the boards, (3) placing a second layer or deck of boards on the stringers, (4) securing the second deck to the stringers by nails, staples, screws, etc., (5) securing the structure to the jig assembly, (6) flipping the jig assembly over to place the assembled structure at an unloading position, (7) unloading and positioning the structure on a trolley or carriage, (8) transferring the structure on the trolley to one or more cutting stations and then, (9) simultaneously trimming the edges of and cutting the structure into two or more pallets having two decks. Advantageously, if desired, this invention also contemplates that the first layer or deck of boards may be omitted to produce a single layer deck pallet or skid structure.

In accordance with this invention the jig assembly has a rectangular frame with a pair of abutting guides adjustably mounted thereon, perpendicular to each other, for aligning the ends of the stringers or other beam-like elements and also for aligning the ends of the deck boards, sheets and the like. A plurality of channels or stringer holders are adjustably positioned on opposite sides of the jig assembly so that parallel disposed stringers can be spaced closer or farther apart to produce pallets, panels or the like of different sizes. In addition, the jig assembly may also have a series of spacers positioned adjustably along a pair of movable supporting rods for spacing of deck boards or the like apart in parallel relationship. Advantageously, the jig assembly is pivotally mounted to swing or flip over through an arc of about 180° so that the work, i.e., the structural elements, in the jig is turned over. In this manner, the bottommost layers, when necessary, can be readily secured to the stringers. Also the work is transferred to an unloading position in the apparatus. Clamps or other locking devices are provided to retain the work in the jig during assembly and while being flipped over.

The apparatus of this invention also includes a carriage or trolley for receiving the work from the jig, which moves along a track to and from the jig assembly to one or more cutting stations and beyond. Advantageously, the trolley may be provided with a rotatable table or platform so that the work can be rotated to change its position relative to the cutters at each cutting station. This device allows the different parts of the work to be cut along lines angular to those previously cut.

One or more cutting stations are provided along the track of the trolley. At each cutting station two or more cutters are disposed above the travel of the trolley. If three cutters are employed, the outermost cutters may be arranged to trim off the edges of the work while the middle cutter divides or cuts the work (i.e. assembled structure) into two similar pallets, panels, or the like. The cutters at the next stations may be similarly arranged so that rotation of the platform through 90° on the trolley causes the cutters at the next station to trim off the other opposite edges of the work and to again divide the work so that four self-similar pallets are produced from the original structure.

Details of the invention as well as the advantages thereof, are set forth in the following specification and illustrated in the accompanying drawings comprising a part thereof.

In the drawings:

FIGURE 5 is a perspective view of one part of my apparatus showing the jig assembly, the trolley and a portion of the track with the other part being broken away;

FIGURE 6 is a perspective view of the other part of my invention showing the cutting stations and drive mechanism for moving the trolley along the track.

Figures 1, 2:
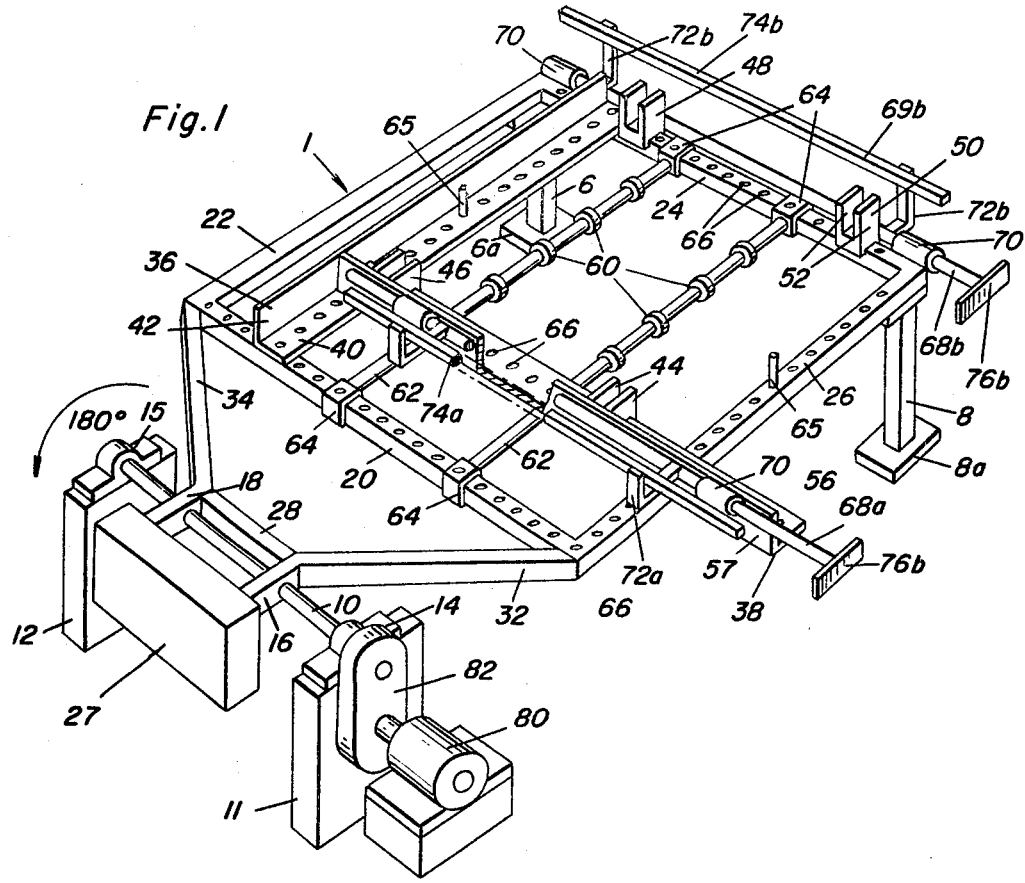
FIGURE 1 is a perspective view of a jig assembly embodying the principles of the invention.
FIGURE 2 is a perspective enlarged view of a partially assembled workpiece for producing pallets in a jig assembly with selected parts of the jig assembly being shown by dotted lines.

It is to be understood that the apparatus illustrated in the accompanying drawings may be constructed of different types of materials and that the material is not necessarily to be restricted to that described in detail hereinafter.

Referring to the drawings:

The jig assembly 1 having a rectangular jig frame is suitably mounted for pivotal movement about a horizontal pivot axis 10 on two piers 11 and 12 of suitable material, for example, reinforced concrete. Positioned atop each of the piers are axially aligned pillow blocks 14 and 15 in which the shaft 10 is free to pivot. The other end of the jig assembly is supported on upright legs 6 and 8, which are secured to the floor by plates 6a and 8a, respectively.

The jig assembly 1, seen to its best advantage in FIGURE 1, in its peripheral form, includes parallel support members 16 and 18, a rectangular jig frame comprised of frame members 20, 22, 24 and 26, and a counter-weight 27, which are joined by additional frame support members 28, 32 and 34. Any material of a durable nature which will suitably support structural elements therein may be used to make the jig frame. It is preferred that the jig assembly is constructed of angle irons secured together by conventional methods, e.g., as by welding or bolting or the like. It is also to be understood that one or more additional members may also be incorporated into the assembly 1 so as to serve to strengthen same.

In accordance with this invention side and head abutting guide members 36 and 38 respectively, are provided on the rectangular frame for aligning the ends of the boards and stringers used to make up a rough workpiece. These members are angle irons having inwardly extending portions 40 and 56, respectively, and upwardly extending portions 42 and 57 respectively. The side guide member 36 is positioned transverse to the pivot axis and is adjustably supported on members 20 and 24 of the jig in a manner hereinafter described in greater detail. The head guide member 38 is also adjustably supported; one end abutting the upwardly extending portion 40 of the side guide member 36 and being supported on the inwardly extending portion 42 of the side guide member 36, and another section of the head guide member 38 being adjustably supported by member 26 of the jig frame.

The jig assembly is also provided with at least four stringer holders or channel members 44, 46, 48 and 50. Each of the holders, for practical purposes, may comprise a pair of upwardly extended elongated rectangular flanges 52 into which the stringers of the workpiece (as best seen in FIGURE 1) may be placed. The lower supporting surface of each holder is slightly above the surface of the frame members so that the stringers will rest on the lower layer of boards or deck of the workpiece. Stringer holders 44 and 46 are adjustably positioned on the inwardly extending portion 56 of head guide member 38 and stringer holders 48 and 50 are adjustably positioned on frame member 24. Thus, holders 44 and 50, and 46 and 48 may suitably be positioned directly opposite to each other because of their adjustable positions on head guide member 38 and frame member 24.

In operation, as illustrated in FIGURE 2, holders 44 and 50, and 46 and 48 are adjustably fixed so as to contain and position the stringers 54 in parallel relation to each other. The upwardly extending members 52 of the holders are spaced apart at a fixed distance, substantially equal to that of the width of the stringers of the workpiece to be assembled within said jig. When using heavy duty jigs, for example, to produce large pallets, stringers approximately three or four inches in width are customarily used and it will be found that most individual manufacturers usually standardize upon a single width of stringer for use in such jigs. The space between the respective members 52 of the holders is generally slightly greater than the width of the stringers 54. Since the upright portion of guide member 38 is adjacent to the holders 44 and 46, and serves as an abutting face for stringers 54, they may be placed within the holders and supported substantially in the vertical position without being wedged therein. It will be appreciated that the stringer holders are necessarily employed in multiples of two and oftentimes in multiples of four.

When a pallet of other workpiece having a deck means comprsing a plurality of boards is to be constructed it is desirable to provide a plurality of spacer elements 60 so as to uniformly space boards relative to each other. Accordingly, there are provided two or more elongated support members 62, e.g., rods, which are adjustably positioned on the rectangular frame defined by the frame members 20, 22, 24 and 26.

In accordance with the invention, the terminal ends of each of support members 62 are positioned within slidable fasteners 64 wherein they can be adjustably positioned; then affixed in a desired position. The support members 62 pass through the center of the spacer elements 60 which may comprise a plurality of cylindrical or toroidal shaped elements. The spacer elements 60 are slidably movable along the axis of said support members 62 and thus may be adjusted to provide sufficient distance therebetween to accommodate boards and concomitantly provide for the space desired between said boards. In addition to the spacer elements, there may also be provided a pair of center pins 65 in order to aid the positioning of the deck boards laid transverse to the support members. These pins are positioned on the side guide member 36 and frame member 26 respectively.

As illustrated in FIGURE 1, a series of cylindrical bores or holes 66 are placed along the upper surfaces of side guide member 36 and of frame member 26 into which the center pin 65 may be placed so as to identify the center-line of the workpiece. Identical bores or holes 66 are also provided in the upper surfaces of frame members 20 and 24 and head guide members 38 to adjustably position and secure members 36 and 38 and fasteners 64 to the jig frame by pins, bolts, or the like readily removable means.

The present invention also contemplates the use of a pair of clamping devices which are pivotally mounted so that they may be positioned in the "open" position when jig assembly is to receive the various components to be assembled and then may be pivotally "closed" to lock the workpiece in place in the jig assembly. The clamping devices 69a and 69b are pivotally positioned on the head guide members 38 and frame member 24, respectively.

As best shown in FIGURE 1, the clamping devices have shafts 68a and 68b. Each shaft is journalled in a suitable pair of bearings 70, secured, i.e., by welding, to guide member 38 and frame member 24 respectively. The bearings are in alignment thereby setting the shafts 68a and 68b parallel, respectively, with guide member 38 and frame member 24. The clamping devices also have L-shaped irons 72a and 72b which extend outwardly and upwardly from the shafts 68a and 68b when the clamping devices are in the "open" position. Permanently affixed near the terminal end of each of the upwardly extending portions of the L irons are bars 74a and 74b which are positioned parallel to shafts 68a and 68b, respectively. In order to pivot each of said clamping devices about the axis provided by its shaft, handles 76a and 76b are affixed to the ends of the shafts to aid in rotational movement of the shafts within the bearings. If desired, other means for pivoting the clamps may be provided, for example, a worm gear mechanism and the like.

It will be appreciated that bearings 70 may have a spring loaded locking pin or the like mechanism positioned therein which cooperates with bores in shafts 68a and 68b to permanently hold the clamping device in a closed position.

As illustrated in FIGURE 2 in making up a workpiece 2 having two decks, boards 58 are placed across support members 62 between spacers 60 with their ends in a common plane defined by guide member 38. Then if the workpiece is to be cut into more than one pallet, additional stringer holders are provided on the jig assembly so that four stringers 54 can be placed crosswise to the boards with their ends in a common plane defined by guide member 36 and in parallel relationship to each other (note holders 45a, 45b, 49a and 49b, shown in dotted lines in FIGURE 2). Then another deck of boards 58 is laid in parallel over the stringers 54, with the desired spacing being provided by a block or like instrument used by the operator loading the jig assembly. The operator then secures the boards to the stringers by nailing, stapling or the like and the clamping devices 69a and 69b are pivoted over the partially assembled workpiece to secure it to the jig assembly.

As heretofore mentioned, the jig assembly is mounted on a pivotal axis 10 so that the entire jig assembly may swing a full 180° arc, i.e., from the horizontal position, as can be realized from FIGURE 5, through an upright position and over into the corresponding inverted horizontal position. It will be apparent that, due to the weight of the jig assembly and an assembled workpiece which may be positioned thereon, the location of the pivot axis 10 is significant in order to facilitate pivoting of the jig assembly between the two horizontal positions noted above. Inasmuch as the major weight of the jig assembly is positioned on one side of the pivot axis, a counter-weight 27 is provided on the opposite side of said assembly and is secured to frame members 16 and 18. In order to pivot the jig assembly about the pivot axis 10, a motor 80 and a gear reducer 82 are provided. When the motor is activated, it powers a slow revolution of the pivot axis so as to effect the pivoting of the jig assembly about the 180° arc. As best illustrated in FIGURE 5, a pair of stanchion supports 86 (one of which is not shown) are provided on each side of track 88 to receive and support the jig assembly after it has been flipped over the axis 10 through the 180° arc.

Figure 3:
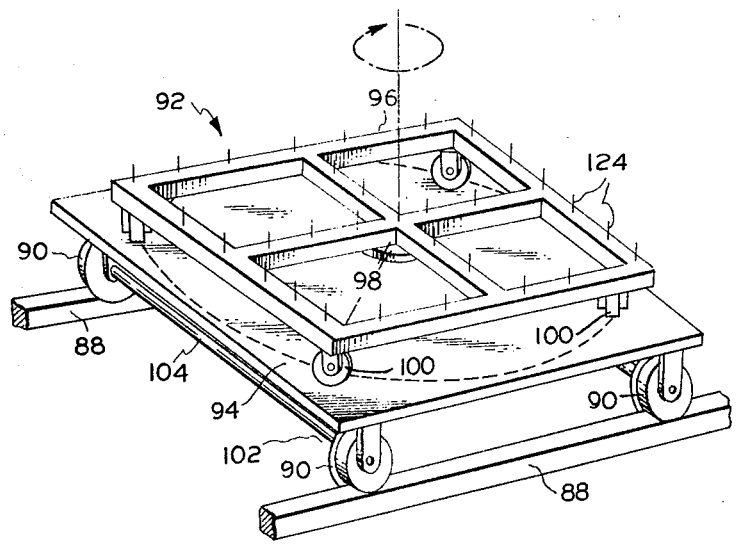
FIGURE 3 is a perspective view of a trolley used by the present invention for transferring the workpiece from the jig assembly to the cutting stations.

Adjacent to the counter-weight end of the jig assembly, as shown in FIGURE 5, is a conveyor system which includes a track 88 which is adapted to receive flanged wheels 90 of a trolley or carriage 92. The trolley is positioned to accept the workpiece contained in the jig assembly after the jig assembly has been pivotly moved through a 180° arc. The trolley includes a base 94 which functions as a support for a turntable or rotatable platform 96 for receiving and positioning of the rough workpiece. As shown in FIGURE 3, the turntable 96 is rotatably positioned on the base member 94 by means of a bearing or pivot block 98. The bearing block recieves an axle or shaft affixed to the turntable thus allowing rotational movement of said turntable 96 within a plane parallel to the base of the trolley.

Positioned under the turntable and preferably affixed to the undersurface thereof are a plurality of casters 100 which lend support to the horizontally-disposed turntable by rolling on base 94. To the under side of the base 94 are fastened four wheel bearings 102 for receiving wheel shafts 104. Each shaft carries two of the trolley wheels 90 which travel on the tracks 88 hereinbefore referred to.

The trolley or carriage 92 is caused to continuously or intermittently travel on the track by a drive mechanism which, in the embodiment illustrated herein, includes a flexible cable 106 connected to the wheel shafts 104 of the trolley. The drive mechanism comprises an electric motor 108 and a gear reducer 109 which drives a winch 110 on which the flexible cable 106 is wound. One strand of the cable, 106a, extends from the winch under a guide 107a to and over a pulley 111 attached at the far end of the conveyor system to be affixed to the back wheel shaft 104. The other strand 106b of the cable extends under guide 107b and is attached to the front wheel shaft 104. With these cable connections the trolley can be moved backward and forward along track 88.

In addition to the jig assembly as hereinbefore described, there is provided a plurality of cutting stations shown in FIGURE 6 as 112 and 114 with an area 116 positioned in between at which the turntable 96 on trolley base 94 may be rotated 90° about its axis. Each of said cutting stations has a pair of upright supports 118 between which is mounted a support rod 120 which is adjustably secured to the uprights by conventional means, journal, bearing, or the like. As shown in FIGURE 6, additional struts, braces and the like are provided to secure the upright supports 118 to the sides of track 88.

Adjustably mounted upon the support rod are a plurality of saw or cutter assemblies 122. Each of the saw assemblies 122 may be identical in construction and may comprise circular saws, chain saws, Carborundum cutting disks and the like. It will, accordingly, be appreciated that the saw assemblies 122 are positioned in FIGURE 5 so as to trim the lateral edges of the workpiece 2 carried on the trolley 92 while at the same time cutting through said workpiece 2 where desired. After the trolley has passed by cutting station 112, turntable 96 is rotated within area 116 prior to the second cutting operation. Thus, it will be observed that the saw assemblies 122 at the second cutting station 114 are positioned so as to once again trim off the lateral edges of the rotated workpiece while also providing a saw to cut through each of the sections of the workpiece resulting from the previous cutting operation. It will be appreciated that the cutter or saw assemblies 122 can be vertically moved together by rotation of support rod 120, or individually, by separate adjustment. Also the saw assemblies are adjustably mounted for horizontal movement across the rods.

Figure 4:
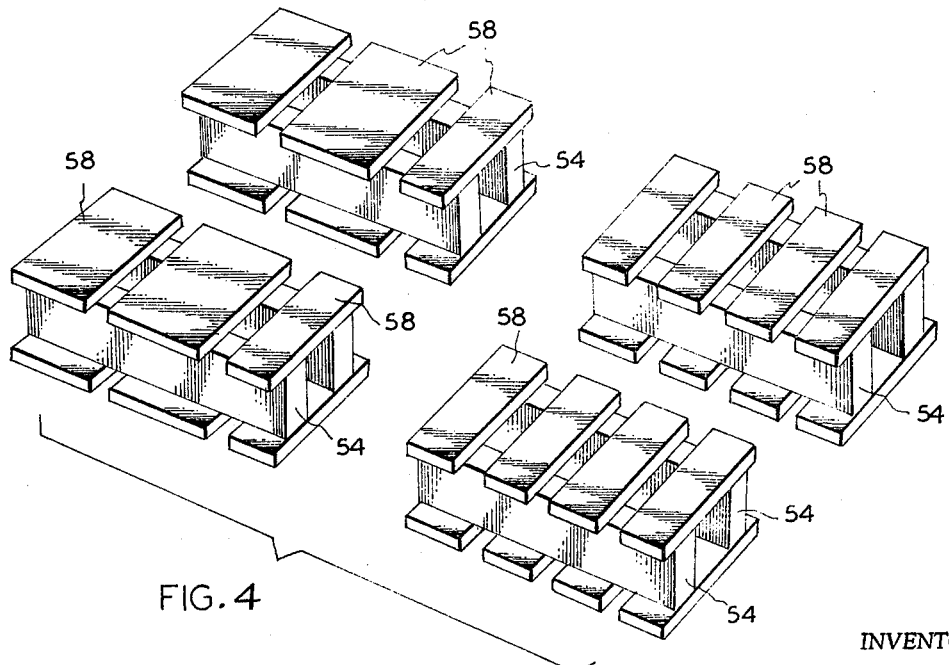
FIGURE 4 is a perspective view of four pallets produced from a workpiece constructed similar to the workpiece shown in FIGURE 2.

As illustrated, the track 88 is straight, but it is contemplated by this invention that this track may also be curved or circular if desired or required, for example, if the space available for the apparatus is of such configuration that it dictates this consideration. The straight track as shown in FIGURE 4 is preferred, howeve, because it requires a relatively simple construction in its straight sections and does not encounter the problem inherent in the use of curved sections in the track.

The method for producing panels, pallets and the like multi-element structures according to this invention will be more readily apparent from the following description of one mode of operation of the above-described apparatus. In brief, however, the method includes the steps of (1) loading of the jig assembly, (2) securing together of at least some of the structural members of the workpiece, (3) flipping of the jig assembly through an 180° arc, (4) securing together of the remaining elements of the workpiece, (5) loading the assembled workpiece onto the trolley, (6) transferring the workpiece to the first cutting station, (7) initially trimming and cutting the workpiece, (8) rotating the workpiece, (9) again trimming and cutting of the workpiece, and (10) removal of the finished products, i.e., pallets, panels, etc. from the trolley. It will be appreciated that the number of steps may be varied and will depend on many factors, such as the lengths of the structural elements which the panels or pallets of this invention are formed, the actual number of panels or pallets which are to be formed from the workpiece resulting from the assembly jig, and the skill of the personnel employed.

It is to be understood that the steps of assembling a pallet as illustrated in accompanying drawing (note FIGURES 2 and 4) are exemplary of the methods of this invention. Moreover, the pallets may be made from different types of materials and the material is not necessarily to be restricted to that described in detail herein. Likewise, it should be understood that in manufacturing the pallets of the type referred to herein, the present invention is particularly adapted to facilitate such manufacturing especially if the stringers for each pallet, which may be substantially identical, are precut so as to provide a supply thereof. On the other hand, the deck boards which usually comprises boards of similar thickness and width, need not and usually are not precut, especially so as to be of the same length.

In order to set up the jig assembly for the fabrication of a plurality of pallets having two decks, guide members 36 and 38 are adjusted on the jig frame to define the minimum length of the boards and the minimum length of the stringers used to prepare a rough workpiece. Then the support members 62 are moved into position to provide support for the lower deck boards and spacer elements 60 are positioned axially thereon to align and to space the boards in a desired parallel relationship. Stringer holders, i.e., 44 and 50 and 46 and 48 are then, respectively, arranged opposite to each other on the jig assembly to position the stringers crosswise to the deck boards. As heretofore described, it will be appreciated that when four finished pallets are desired, four stringers and consequently eight stringer holders are necessary. In such an arrangement, the two middle stringer holders will often be positioned closely adjacent to each other (see FIGURE 2).

After the jig assembly has been adjusted as described above, the deck boards are placed transverse the elongated members 62 and within the space defined by the spacer elements 60 with one end of each board 58 being abutted against the upwardly extending portion 40 of side guide member 36. Subsequently, the stringers 54 are placed within the stringer holders with one end of each stringer being abutted against the upwardly extending portion 57 of head guide member 38. A second layer of deck boards 58 are then placed upon the upper surfaces or edges of the stringers 54, the terminal ends of said second layer of deck boards also being placed in abutment against the inner surface of the upwardly extending portion 40 of the side guide member. A heretofore described, in order to provide for proper spacing of the upper deck boards relative to each other, a portable spacer block having the same dimensions as the spacer elements 60 may be employed to position the boards on the upper layer in similar relationship to those on the lower layer. When the boards have been placed upon the stringers so as to substantially cover the same and extend to the outer ends thereof, nails, or other securing means such as screws, are applied to the deck boards and into the stringers to form a substantially continuous single deck. This may be done either manually or in mechanized establishments by a nailing machine, which may have been moved to the assembly jigs by suitable conveyor means. After the top deck has been secured to the stringers, the clamping devices are pivotally positioned to secure the thus-far finished pallet workpiece to the jig assembly and thus make the assembly ready for 180° rotation about the pivot axis.

In order to effect such rotation, the motor 84 is energized to rotate the pivot axis 10 and the jig assembly affixed thereto. Upon completion of rotation of the jig assembly about the aforesaid 180° arc, it is apparent that the boards comprising the former bottom layer of deck of the workpiece become transposed and thus become the top members of the workpiece. As effected previously, nails or other securing means are applied through the deck boards into the stringers to form a completely fastened pallet workpiece. Upon completion of the nailing or other suitable fastening steps, the clamping means are pivotally moved to "open" position thus allowing the workpiece 2 to be lowered and centered on the turntable 96 on the trolley or carriage. In oder to insure firm positioning of the workpiece on turntable 96, a plurality of sharp pins 124 upwardly extending from the surface of turntable 96, are provided. These pins hold the workpiece in place on the turntable and also position the workpiece above and separate from the turntable so that it may be trimmed and cut in subsequent stages of operation. After the workpiece has been released onto the turntable, the jig assembly may be returned to its initial horizontal position by reactivation of the motor 84 with an accompanying reversal in the gear reducer 86, to rotate the pivot axis 10 in a direction opposite to that previously effected.

Upon positioning of the workpiece 2 upon the turntable 96, the device mechanism is activated to cause rotation of the winch 110 and winding of the cable 106 attached thereto, thereby causing the trolley 92 to travel along the track 88. The trolley travels along the track 88 as it passes through the first cutting station 112 whereat the lateral edges of the workpiece 2 are trimmed by the saws positioned at or near the ends of support 120. Also the workpiece 2 may be bisected by a saw positioned about midway of support 120.

After trimming and bisecting at the first cutting station the trolley 92 is caused to travel until area 116 is reached. Then the turntable 96 is rotated 90° about its axis. After such rotation is effected, the trolley 92 continues along the track 88 to the second cutting station. At this cutting station an operation not unlike that of the first cutting station is effffected, and the terminal ends of each section of the resulting bisected workpiece 2 are trimmed and each section is bisected so as to form four separate and complete pallets as best shown in FIGURE 5.

The trolley is then moved clear of the saws, the finished pallets are removed from the trolley, and the trolley is returned to its initial position adjacent to the jig assembly. It is understood that while the trimming, bisecting, and the like operations are being effected, the jig assembly, which now has been returned to its original horizontal position, may be reloaded in the manner as hereinbefore described and preparation of another pallet workpiece may be initiated. In this manner, a continuous method for production of pallets is provided for.

It will be seen that the present invention provides a novel method and apparatus which is particularly adapted for use in assembling pallets and the like. The preceding description delving into details of certain constructional features, however, should not be construed in a limited sense, as various changes and modifications within the spirit of this invention and within the scope of the appneded claims will occur to the person skilled in the art. For example, the stringers and the boards comprising the deck may be replaced by a suitably shaped solid unitary element or the boards alone may be replaced with a suitably shaped unitary element so as to produce a "sandwich" panel or a hollow panel respectively. Similarly, while the foregoing description is related to the construction of pallets from boards having uniform widths, it will be appreciated that random widths of boards (of uniform thickness) may also be utilized. Further, while a space or gap is provided between said boards, it will be appreciated that the boards may be abutted against each other and thus provide for a substantially solid deck means. Still further, while the foregoing description was directed primarily to workpieces produced from wood, it will also be appreciated that other materials are suitable for use in the products of this invention. Thus, suitable materials include, besides wood per se, wood composition products, metals, as well as various forms of plastics, e.g., blown, foamed, laminated, and the like plastics.

What is claimed is:

1. A jig assembly for fabricating a structure having at least one deck component secured to elongated support components in stacked relationship, which comprises a rectangular jig frame pivotally mounted to swing about an axis from one horizontal position to another, adjustable guide means on said frame for aligning the deck and the support components with respect to each other and to the sides of the jig frame; a plurality of holding means adjustably positioned on said frame and said guide means for supporting and positioning the support components substantially parallel to each other and in stacked relation to said deck, a plurality of parallel support rods adjustably secured to said frame below said holding means to support a deck component; each of said rods having a plurality of spacer elements for spacing and aligning the components making up the deck in parallel relationship, and clamping means mounted on said guide means and said jig frame for clamping the deck and the support components to the jig assembly whereby the deck and support components are held in fixed positions relative to each other and to the jig frame assembly when the jig assembly is flipped from one horizontal position to another.

2. The jig assembly of claim 1 in which the adjustable guide means include a side guide member and a head guide member which are perpendicular to each other; the ends of the side guide member adjustably supported on the jig frame and parallel to one of its sides, and one end of the head guide member abutted against and adjustably supported on the side guide member with another part of the head guide member adjustably supported on the jig frame whereby the guide means can be adjusted to accommodate deck and support components of different sizes.

3. The apparatus of claim 11 in which said cutting stations are spaced sufficiently apart from each other to provide a space in which said assembled structures may be rotated about 90°.

4. A method for fabricating a structural unit having at least one deck component secured to a plurality of elongated support components in stacked relation which comprises positioning said deck components in parallel and spaced relationship to each other, positioning said support components transversely to said deck components, holding and positioning said deck components and said support components in fixed positions relative to each other, securing said components together to form an assembled structure, transferring the assembled structure from the point of assembly to at least one cutting station and thereafter trimming and cutting the assembled structure to form at least one structural unit having a desired size and shape.

5. A method for the fabrication of a plurality of pallets having two decks of boards secured to a plurality of elongated stringers in stacked relationship which comprises placing a first layer of boards in a pivotly mounted jig means, supporting said stringers crosswise to said boards in said jig means, placing a second layer of boards on said stringers, securing the second layer to the upper surfaces of said stringers, clamping the resulting structure to said jig means, flipping the jig means through an arc of 180° to position the resulting structure at an unloading station, securing the upper most layer of boards to said stringers to form a completely assembled structure, unloading and positioning the assembled structure on conveyor means, transferring the assembled structure on conveyor means to at least one cutting station, trimming the edges of and cutting the structure into at least two similarly shaped pallets and thereafter removing said pallets from said conveyor means.

6. The method of claim 5 which includes rotating said pallets with respect to said cutting means, passing the rotated pallets to a second cutting means and thereafter cutting said pallets into at least four similarly shaped pallets.

7. A jig assembly for fabricating a structure having at least one deck component secured to elongated support components in stacked relationship which comprises a rectangular jig frame pivotally mounted to swing about an axis from one horizontal position to another, said jig frame positioned on one side of said axis and a counterweight secured to said jig frame and positioned on the other side of said axis to facilitate flipping the assembly through an 180° arc, adjustable guide means on said frame for aligning the deck and support components with respect to each other and to the sides of the jig frame; a plurality of holding means adjustable positioned on said frame and said guide means for supporting and positioning the support components substantially parallel to each other and in stacked relation to said deck, and clamping means mounted on said guide means on said jig frame for clamping the deck and the support components to the jig assembly, whereby the deck and support components are held in fixed relationship with each other and to the jig frame assembly when the assembly is flipped from one horizontal position to another.

8. An apparatus for producing a plurality of units having at least one deck component secured to a plurality of elongated support components in stacked relationship which comprises adjustable jig means for facilitating assembly of structures of various sizes, conveyor means positioned adjacent to said jig means for receiving and transferring assembled structures from said jig means, cutting means arranged along the path of said conveyor means to trim and cut the structures into at least two similarly constructed units; said jig means being pivotally mounted about a horizontal axis so as to be flipped from one horizontal position to another and thereby effect transfer of the assembled structures from the jig means to said conveying means.

9. An apparatus for producing a plurality of units having at least one deck component secured to a plurality of elongated support components in stacked relationship which comprises adjustable jig means for facilitating assembly of structures of various sizes, a trolley positioned adjacent to said jig means for receiving and transferring assembled structures from said jig means, a track for carrying said trolley, cutting means arranged along said track to trim and to cut the structures into at least two similarly constructed units and drive means for moving said trolley along said track whereby said trolley may be moved from said jig means to said cutting means and then into an unloading zone.

10. An apparatus for producing a plurality of units having at least one deck component secured to a plurality of elongated support components in stacked relationship which comprises adjustable jig means for facilitating assembly of structures of various sizes, conveyor means positioned adjacent to said jig means for receiving and transferring assembled structures from said jig means, cutting means arranged along the path of said conveyor means to trim and cut the structures into at least two similarly constructed units; said conveyor means including a trolley having a rotatable turntable whereby an assembled structure can be rotated relative to said cutting means.

11. An apparatus for producing a plurality of units having at least one deck component secured to a plurality of elongated support components in stacked relationship which comprises adjustable jig means for facilitating assembly of structures of various sizes, conveyor means positioned adjacent to said jig means for receiving and transferring assembled structures from said jig means, cutting means arranged along the path of said conveyor means to trim and cut structures into at least two similarly constructed units; said cutting means including a plurality of cutting stations spaced along the path of said conveyor means, said cutting stations each having a plurality of cutting assemblies adjustably mounted for trimming and cutting said assembled structures and said cutting assemblies being supported by a pair of upright supports mounted on opposite sides of the path of said conveyor means whereby said conveyor means is beneath said cutting assemblies.

12. A method for fabricating a structural unit having at least one deck component secured to a plurality of elongated support components in stacked relationship which comprises holding and positioning said deck components and said support components in fixed positions relative to each other, securing said components together to form an assembled structure, transferring the assembled structure from the point of assembly to a first cutting station, trimming and cutting said assembled structure into two sections at said first cutting station, rotating the trimmed sections through 90°, passing the sections to a second cutting station, and then further trimming and cutting the sections into additional structural units each having a desired size and shape.

References Cited by the Examiner
UNITED STATES PATENTS

| | | | |
|---|---|---|---|
| 2,038,000 | 4/1936 | Parker | 144—3 |
| 2,427,133 | 9/1947 | Grabner | 144—288 |

WILLIAM W. DYER, Jr., *Primary Examiner.*

R. J. ZLOTNIK, *Assistant Examiner.*